US009898595B2

(12) United States Patent
Sturm et al.

(10) Patent No.: US 9,898,595 B2
(45) Date of Patent: Feb. 20, 2018

(54) MONETIZED ONLINE CONTENT SYSTEMS AND METHODS AND COMPUTER-READABLE MEDIA FOR PROCESSING REQUESTS FOR THE SAME

(71) Applicant: Thomson Reuters Global Resources, Baar (CH)

(72) Inventors: Robert Sturm, Cottage Grove, MN (US); Richard N. Dauk, Apple Valley, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 0 days.

(21) Appl. No.: 15/338,678

(22) Filed: Oct. 31, 2016

(65) Prior Publication Data

US 2017/0048231 A1    Feb. 16, 2017

Related U.S. Application Data

(63) Continuation of application No. 12/982,446, filed on Dec. 30, 2010, now Pat. No. 9,594,887.

(51) Int. Cl.
*H04L 29/06*        (2006.01)
*G06F 21/31*        (2013.01)
(Continued)

(52) U.S. Cl.
CPC ........ *G06F 21/31* (2013.01); *G06F 17/30522* (2013.01); *G06F 17/30554* (2013.01);
(Continued)

(58) Field of Classification Search
CPC ............. G06F 21/31; G06F 2221/2137; G06F 17/30522; G06F 17/30554;
(Continued)

(56) References Cited

U.S. PATENT DOCUMENTS 7,096,268 B1* 8/2006 Shoda ..................... G06F 21/10
                                                         709/225
8,320,882 B2* 11/2012 Hinton ................ H04L 63/0407
                                                         380/247
(Continued)

OTHER PUBLICATIONS

Parnas, D., "On the Criteria to be Used in Decomposing Systems into Modules," Communications of the ACM, 1053-58, 15(12), 1972.

(Continued)

*Primary Examiner* — Tri Tran
(74) *Attorney, Agent, or Firm* — Norton Rose Fulbright US LLP (57) ABSTRACT

One aspect of the invention provides a computer system having processing and memory means operable to provide a monetized online content system. The computer system is coupled to one or more resource modules each having data in the memory means and includes: an interceptor module configured to receive a request from a client for one or more resources available from one or more resource modules, refer the request to one or more of the resource modules configured to fulfill the request, receive one or more responses from one or more of the resource modules, at least one of said one or more responses having one or more events associated therewith, and transform the one or more responses by removing the one or more events associated with the one or more responses prior to presentation of the one or more responses to the client.

19 Claims, 3 Drawing Sheets

(51) Int. Cl.
*G06F 17/30* (2006.01)
*G06F 21/62* (2013.01)

(52) U.S. Cl.
CPC .. *G06F 17/30569* (2013.01); *G06F 17/30867* (2013.01); *G06F 21/6245* (2013.01); *H04L 63/0245* (2013.01); *H04L 63/083* (2013.01); *G06F 2221/2137* (2013.01)

(58) Field of Classification Search
CPC .......... G06F 17/30867; G06F 21/6245; G06F 17/30569; H04L 63/083; H04L 63/0245
See application file for complete search history.

(56) References Cited

U.S. PATENT DOCUMENTS

| | | | | |
|---|---|---|---|---|
| 9,009,799 | B2* | 4/2015 | Mason | H04L 63/08 726/6 |
| 2003/0004934 | A1* | 1/2003 | Qian | G06F 17/30867 |
| 2004/0015703 | A1* | 1/2004 | Madison | H04L 63/0807 713/185 |
| 2006/0143127 | A1* | 6/2006 | Allard | G06Q 10/10 705/51 |
| 2009/0307757 | A1* | 12/2009 | Groten | H04L 29/06027 726/4 |

OTHER PUBLICATIONS

Kiczales, G. et al., "Aspect-Oriented Programming," Proceedings of the European Conference on Object-Oriented Programming (ECOOP), 1997.
Fielding, R., "Achitectural Styles & the Design of Network-based Software Archtectures," 2000, Dissertation, University of California, Irvine.
Murphy, G. et al., "Does Aspect-Oriented Programming Work?" Communications of the ACM 75-77, 44(10), 2001.
Schmidt, D., "Middleware for Real-Time and Embedded Systems," Communications of the ACM, 43-48, 45(6), 2002.
Fielding, R. et al., "Principled Design of the Modern Web Architecture," 2(2) ACM Trans. on Internet Tech., 2002, 115-50.
Grace, P. et al., "The Case for Aspect-Oriented Reflective Middleware," Proc. of the 6th International Workshop on Adaptive and Reflective Middleware, 2007.
Zhang, C. et al., "Efficiently Mining Crosscutting Concerns through Random Walks," AOSD '07: Proceedings of the 6th International Conference on Aspect-Oriented Software Development, 226-38, 2007.
Demchenko, Y. et al., "Authorisation Infrastructure for On-Demand Network Resource Provisioning," in "GRID '08: Proceedings of the 2008 9th IEEE/ACM International Conference on Grid Computing," 2008, 95-103.

* cited by examiner

MONETIZED ONLINE CONTENT SYSTEMS AND METHODS AND COMPUTER-READABLE MEDIA FOR PROCESSING REQUESTS FOR THE SAME

CROSS-REFERENCE TO RELATED APPLICATIONS

The present application is a continuation of U.S. patent application Ser. No. 12/982,446, entitled MONETIZED ONLINE CONTENT SYSTEMS AND METHODS AND COMPUTER-READABLE MEDIA FOR PROCESSING REQUESTS FOR THE SAME, filed Dec. 30, 2010, the disclosure of which is incorporated herein by reference in its entirety.

BACKGROUND

Online research services such as WESTLAW® and WESTLAW NEXT™, available from Thomson Reuters of Eagan, Minn., continue to be ubiquitous to individuals and businesses of all sizes.

As these services continue to expand in popularity, the breadth of information and services provided also continues to expand. This increased breadth introduces additional complexity to the systems because newly-added content may be provided by additional servers. As the number of servers increases, the challenges of enforcing policies (e.g., policies governing security, billing, and the like) across each server grow.

Moreover, various Internet architectures rely on sequences of HTTP requests and responses, HTTP cookies, or other client-side storage means to maintain the system's current state and track client activity (e.g., for billing). Such architectures can be manipulated by a knowledgeable user to obtain free services.

Accordingly, there is a need for new systems that allow for centralized enforcement of policies and hide internal processes from customers.

SUMMARY OF THE INVENTION

One aspect of the invention provides a computer system having processing and memory means operable to provide a monetized online content system. The computer system is coupled to one or more resource modules each having data in the memory means and includes: an interceptor module configured to receive a request from a client for one or more resources available from one or more resource modules, refer the request to one or more of the resource modules configured to fulfill the request, receive one or more responses from one or more of the resource modules, at least one of said one or more responses having one or more events associated therewith, and transform the one or more responses by removing the one or more events associated with the one or more responses prior to presentation of the one or more responses to the client.

This aspect of the invention can have a variety of embodiments. At least one of the events can be a billing event. The at least one of the events can be a user experience event. The code executable on the interceptor module can be further configured to cause the processing means to record one or more of the events.

The system can include an authentication module in communication with the interceptor module. The authentication module can include code executable on the processing means configured to authenticate the client. The interceptor module can further include code configured to cause the processing means to: identify one or more credentials in the request; present the credentials to the authentication module; and delay the step of referring the request to the one or more resource modules until the authentication module indicates that the client is authenticated.

The interceptor module can be further configured to: maintain a list of recently-authenticated clients and a time at which the client was most-recently authenticated by the authentication module; if the client was most-recently authenticated within a defined interval, refer the request without presenting the one or more credentials; and if the client was most-recently authenticated beyond the defined interval, present the one or more credentials to the authentication module.

The defined interval can be selected from the group consisting of: 1 second, 5 seconds, 10 seconds, 15 seconds, 30 seconds, 45 seconds, 1 minute, 5 minutes, 10 minutes, 15 minutes, 20 minutes, 30 minutes, 45 minutes, 1 hour, 3 hours, 6 hours, 12 hours, 1 day, 2 days, 3 days, 1 week, and 1 month.

The defined interval can be selected from the group consisting of: less than about 1 minute, between about 1 minute and about 5 minutes, between about 5 minutes and about 10 minutes, between about 10 minutes and about 15 minutes, between about 15 minutes and about 20 minutes, between about 20 minutes and about 30 minutes, between about 30 minutes and about 45 minutes, between about 45 minutes and about 1 hour, between about 1 hour and about 3 hours, between about 3 hours and about 6 hours, between about 6 hours and about 12 hours, between about 12 hours and about 1 day, between about 1 day and about 2 days, between about 2 days and about 3 days, between about 3 days and about 1 week, and between about 1 week and about 1 month.

The system can include an authorization module in communication with the interceptor module, the authorization module having code executable on the processing means configured to cause the authorization module to verify whether the client is authorized to access the one or more resources.

Another aspect of the invention provides a method for processing requests for a monetized online content system. The method includes: receiving a request from a client in processing means for one or more resources resident in one or more resource modules coupled to the processing means; referring the request to the one or more of the resource modules to fulfill the request; receiving one or more responses from one or more of the resource modules having data responsive to the request, at least one of said one or more responses having one or more events associated therewith; transforming the one or more responses by removing one or more events associated with the one or more responses prior to presentation of the one or more responses to the client.

This aspect of the invention can have variety of embodiments. At least one of the events can be a billing event. At least one of the events can be a user experience event. The method can include recording at least one event associated with the one or more responses.

The method can include identifying one or more credentials in the request; presenting the credentials to the authentication module; and delaying the step of referring the request to the one or more resource modules until the authentication module indicates that the client is authenticated.

The method can include maintaining a list of recently-authenticated clients and a time at which the client was most-recently authenticated by the authentication module; and if the client was most-recently authenticated within a defined interval, referring the request without presenting the one or more credentials; and if the client was most-recently authenticated beyond the defined interval, presenting the one or more credentials to the authentication module.

The method can include communicating with an authorization module configured to verify whether the client is authorized to access the one or more resources.

The method can be a computer-implemented method.

Another aspect of the invention provides a computer program product including computer-usable medium having control logic stored therein for causing a computer to process requests for a monetized online content system. The control logic includes: first computer readable program code means for causing the computer to receive a request from a client for one or more resources available from one or more resource modules coupled to the computer; second computer readable program code means for causing the computer to refer the request to one or more of the resource modules operable to fulfill the request; third computer readable program code means for causing the computer to receive one or more responses from one or more of the resource modules, at least one of said one or more responses having one or more events associated therewith; and fourth computer readable program code means for causing the computer to remove one or more events associated with the one or more responses prior to presentation of the one or more responses to the client presenting the one or more responses.

This aspect of the invention can have a variety of embodiments. The computer-readable medium can be non-transitory and tangible. The control logic can further include fifth computer readable program code means for causing the computer to recording at least one event associated with the one or more responses.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE INVENTION

The present invention is now described more fully with reference to the accompanying drawings, in which an illustrated embodiment of the invention is shown. The invention is not limited in any way to the illustrated embodiment as the illustrated embodiment described below is merely exemplary of the invention, which is embodied in various forms, as appreciated by one of ordinary skill in the art. Therefore, it is to be understood that any structural and functional details disclosed herein are not to be interpreted as limiting the invention, but rather are provided as a representative embodiment for teaching one of ordinary skill in the art one or more ways to implement the invention. Furthermore, the terms and phrases used herein are not intended to be limiting, but rather are to provide an understandable description of the invention.

It is to be appreciated that the embodiments of this invention as discussed below may be incorporated as a software algorithm, program or code residing in firmware and/or on computer useable medium (including software modules and browser plug-ins) having control logic for enabling execution on a computer system having a computer processor. Such a computer system typically includes memory storage configured to provide output from execution of the computer algorithm or program having processing means.

Monetized Online Content Systems

Figure 1:
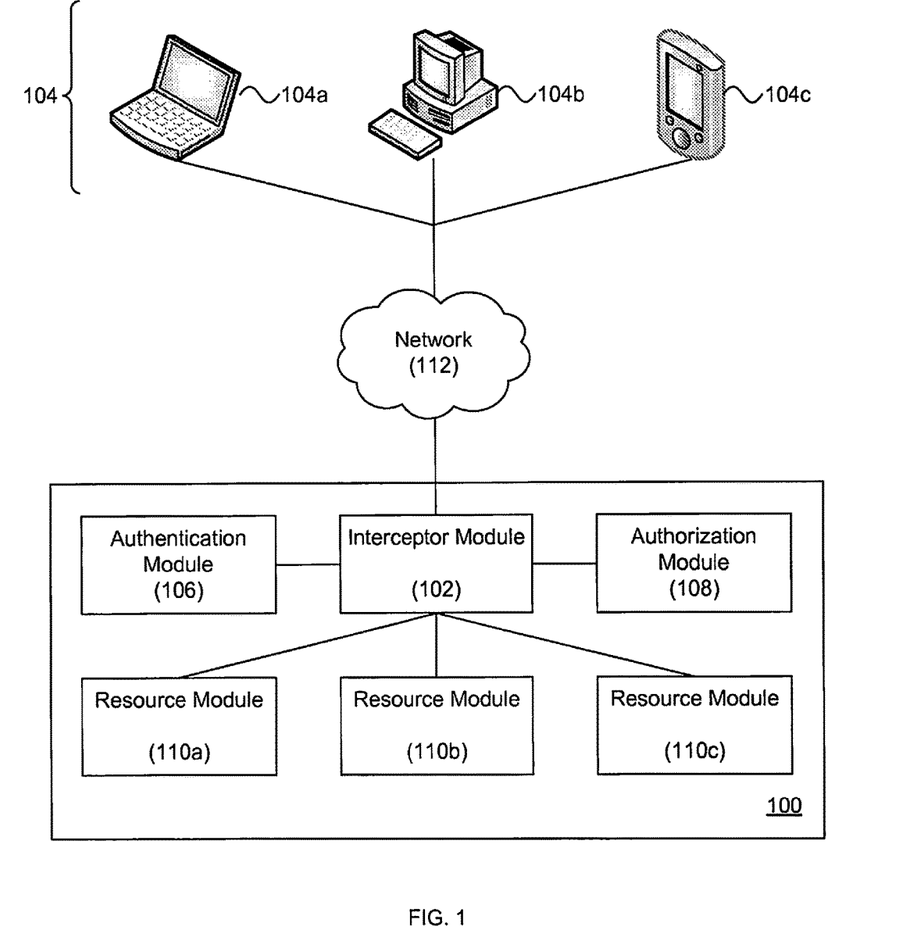
FIG. 1 depicts a monetized online content system according to one embodiment of the invention.

FIG. 1 depicts a monetized online content system 100 according to one embodiment of the invention. The monetized online content system 100 provides content such as documents, databases, images, audio, video, and the like to users via various computer networks 112 such as the Internet. Monetized online content system 100 enables the construction and operation of content-based business models including subscription-based business models in which users pay a fee that affords substantially unlimited access to content, transactional-based business models in which users pay a fee based on the amount of content utilized, and advertising-based business models in which advertising is provided with the content in order to fund the service.

The system 100 includes an interceptor module 102 configured to receive one or more requests from one or more clients 104. The system 100 optionally includes an authentication module 106 configured to determine whether the user/client 104 is permitted to access the system 100, an authorization module 108 configured to determine whether the user/client 104 is permitted to access particular resources, and/or one or more resource modules 110.

Interceptor module 102 pools resources on behalf of resource modules 110. For example, a plurality of interceptor modules 102 may each maintain connections to a network-attached storage (NAS) device (not depicted) on behalf of resource modules 110.

As discussed herein, authentication module 106 is configured to determine whether the user/client 104 is permitted to access the system 100 and authorization module 108 is configured to determine whether the user/client 104 is permitted to access permitted resources. Embodiments of the authentication module 106 and/or the authorization module 108 implement conventional or proprietary access control algorithms, for example, in hardware or software. As further discussed herein, the authentication module 106 and/or the authorization module 108 are in some embodiments implemented as physically separate entities (e.g., separate computers) from other system components such as interceptor module 102. In other embodiments, the authentication module 106 and/or the authorization module 108 are implemented as separate software processes on the same computer that implements the interceptor module 102.

Resource modules 110 provide resources desired by clients 104. Exemplary resources are files, databases, physical components (e.g., processors, printers, and the like). For example, resource modules 110 in a legal monetized online content system 100 provide collections of law-focused decisions, journals, treatises, administrative materials, dockets, court filings, and the like. In another example, resource modules 110 in a finance-focused monetized online content system 100 provide company research, historical asset prices, and the like. In still another example, resource modules 110 provide processing capabilities. For example, resource modules 110 perform computationally-intensive calculations for customers.

Clients 104 are a laptop computer 104a, desktop computer 104b, handheld device 104c (e.g., a table computer, personal digital assistant, cellular telephone, smart phone), and the like now known and later developed. As can be appreciated by one of ordinary skill in the art, clients 104 (and other elements herein) can be singular or plural. Clients 104 have display(s) appreciated by those of ordinary skill in the pertinent art. The displays are any of a number of devices known to those skilled in the art for displaying images responsive to outputs signals from the clients 104. Such devices include, but are not limited to, cathode ray tubes (CRTs), liquid crystal displays (LCDs), plasma screens and the like. Although a simplified diagram is illustrated in FIG. 1, such illustration shall not be construed as limiting the present invention to the illustrated embodiment. It should be recognized that the signals output from the clients 104 originate from any of a number of devices including PCI or AGP video boards or cards mounted within the housing of the clients 104 that are operably coupled to the microprocessors and the displays thereof.

Clients 104 access system 100 through proprietary or commercially-available software. For example, clients 104 utilize an Internet browser to access a Hypertext Transfer Protocol (HTTP) interface provided by system 100 (e.g., interceptor module 102). Suitable Internet browsers include INTERNET EXPLORER®, available from Microsoft Corporation of Redmond, Wash.; FIREFOX®, available from the Mozilla Foundation of Mountain View, Calif.; OPERA®, available from Opera Software AS of Oslo, Norway; or CHROME™, available from Google Inc. of Menlo Park, Calif. Alternatively, clients 104 interact with system 100 via specially-programmed software such as an application installed on clients 104.

Although clients 104 may be referred to herein as autonomous objects, one of ordinary skill in the art appreciates that such references incorporate one or more users interacting with the clients 104 unless otherwise contradicted. For example, a client's authentication and/or authorization is a reflection of the authentication and/or authorization of a user of the client 104. In another example, the client 104 is an autonomous third-party computer (e.g., a server) configured to access resources within system 100 for use in a service provided by a third party (e.g., under a different trademark).

The systems and methods described herein advantageously handle cross-cutting concerns in a centralized location. As a result, the systems and methods herein promote high coherence within interceptor module 102 and loose coupling between interceptor module 102 and other modules 106, 108, 110. Thus, authentication and authorization testing is focused on interceptor module 102, which, together with authentication module 106 and authorization module 108, acts a firewall for system 100. Moreover, resource modules 110 are concerned with creating events and are not concerned with the mechanics of logging events.

Interceptor module 102, authentication module 106, authorization module 108, and resource modules 110 are augmented as necessitated by various workloads and processing demands for various aspects of system 100. For example, if client 104 sends n parallel requests for resources from several resource modules, the system 100 executes the authorization logic once and the authentication logic 0 to n times. Thus, if the authentication module 106 is utilized more than authorization module 108, system 100 accommodates additional authentication modules 106 to handle the increased load without the need to necessarily increase authentication module 106 or resource module 110 capacity.

Moreover, the systems and methods described herein simplify testing of system 100. Because authentication and authorization concerns are removed from resource modules 110, trusted users (e.g., internal software developers) easily isolate and test the core functionalities of resource modules 110, thereby promoting efficient development and testing.

System 100 is implemented on a single piece of software or hardware such as general purpose computers, including, but not limited to computers with higher processing power colloquially known as servers. In such an embodiment, each of the one or more modules 102, 106, 108, 110 included in a particular configuration of system 100 are implemented as individual processes, threads, objects, components, and the like. Such individual processes, threads, objects, components, and the like can be processed by one or more processors.

Alternatively, one or more modules 102, 106, 108, 110 are implemented on separate pieces of software or hardware such as general-purpose computers, including, but not limited to computers with higher processing power colloquially known as servers. In such an embodiment, each of the one or more modules 102, 106, 108, 110 included in a particular configuration of system 100 can communicate via various protocols known to those of ordinary skill in the art.

Modules 102, 106, 108, 110 can utilize one or more publicly-available software components. In one embodiment, interceptor module 102 is a specially-programmed web server such as the Apache HTTP Server, Apache Tomcat, and MICROSOFT® Internet Information Services. Modules 102, 106, 108, 110 are programmed with a variety of programming languages such as JAVA®, C/C++, Perl, MICROSOFT®.NET, and the like.

Request Processing Methods

Figure 2:
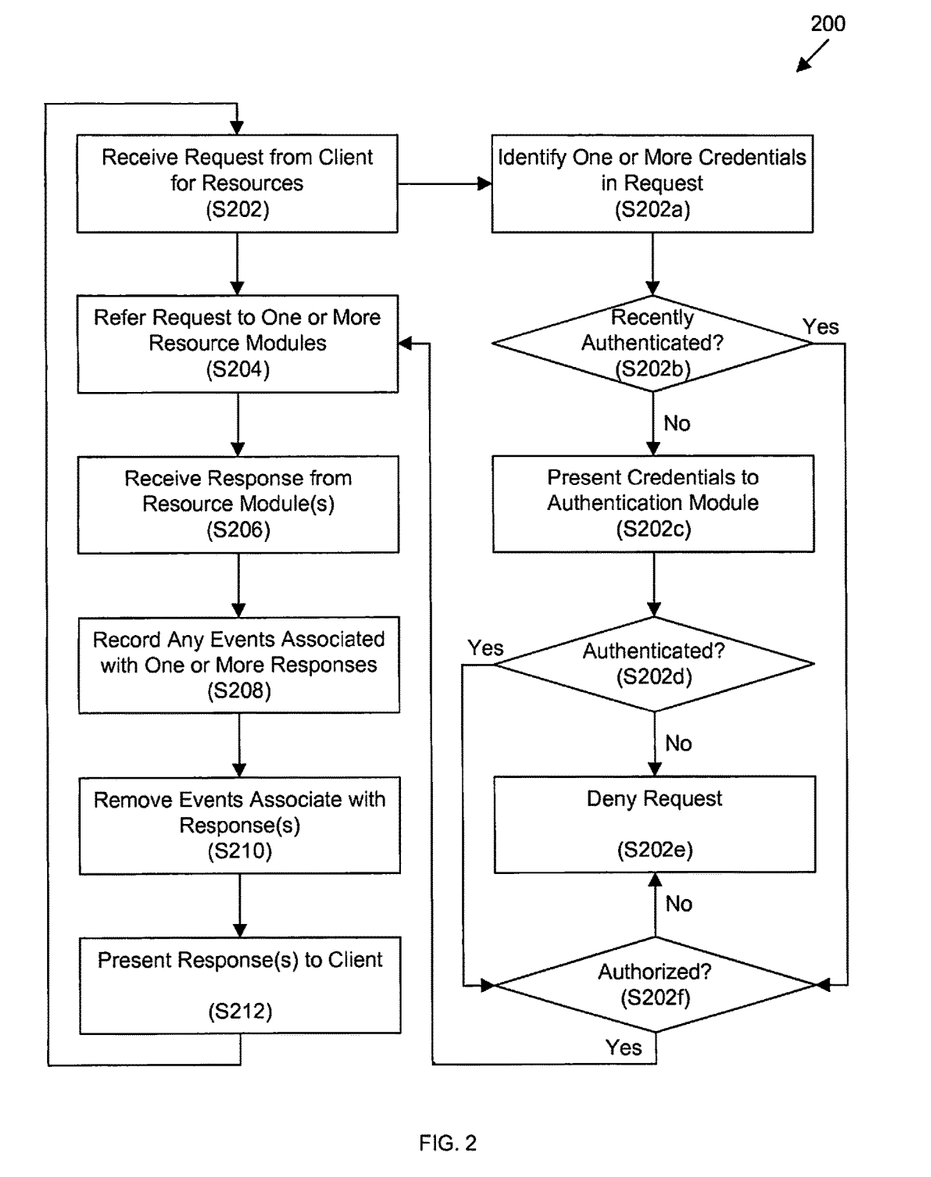
FIG. 2 depicts a method of processing requests for a monetized online content system according to an embodiment of the invention.

Referring now to FIG. 2, interceptor module 102 is configured to implement method 200.

In step S202, a request for resources available from one or more resource modules 110 is received from a client 104. The request is received via a network 112. Network 112 can be the Internet, an intranet, and the like.

The request is structured in a variety of well-known or proprietary formats. For example, client 104 and interceptor module 102 communicate via Representational State Transfer (REST) as described in Roy T. Fielding & Richard N. Taylor, "Principled Design of the Modern Web Architecture," 2(2) *ACM Trans. on Internet Tech.* 115-50 (2002) and Roy Thomas Fielding, *Architectural Styles & the Design of Network-based Software Architectures* (2000) (Dissertation) (University of California, Irvine). In such an example, the requests are GET and POST requests as defined under the Hypertext Transfer Protocol (HTTP). The Hypertext Transfer Protocol is described in publications such as Andrew S. Tanenbaum & Maarten van Steen, *Distributed Systems: Principles & Paradigms* §§11.1.2 & 11.1.3 (2002).

The method 200 includes one or more steps for authenticating the client 104. For example, in step 202a, the interceptor module 102 identifies one or more credentials in a request. Interceptor module 102 identifies credentials using tools such as regular expressions as implemented in a variety of programming languages such as Perl, Ruby, and Tcl and described in publications such as H. M. Deitel et al., *Perl: How to Program* 253-83 (2001) and Robert W. Sebesta, *Programming the World Wide Web* §4.10 (2002).

Credentials are presented in many forms. For example, requests from client 104 include a username and password as a credential. Alternatively, the credential includes a unique token, which may be a hash of a username, password, and/or other information (e.g., a timestamp). The token (e.g., an authentication token, an entitlement token, and the like) is generated by client 104, interceptor module 102, and/or authentication module 106 and is stored locally on the client 104 using a persistent object such as a cookie in conventional Internet architectures and/or Local Stored Objects (LSOs) in FLASH® or AIR® platforms. Cookies are described in H. M. Deitel et al., *Internet & World Wide Web: How to Program* 1060-68 (2000). The FLASH® or AIR® software platforms are available from Adobe Systems Incorporated of San Jose, Calif.

The interceptor module 102 maintains a list of recently authenticated clients 104. Such a list advantageously reduces authentication delays for active clients. The interceptor module 102 determines in step S202b if a client 104 was recently authenticated and, if the client was recently authenticated, proceed to step S202f and determine if the client is authorized to access the requested resource. Alternatively, if the client 104 was not recently authenticated, the interceptor module presents credentials to an authentication module 106 in step S202c.

Whether a client 104 was recently authenticated is determined in a variety of steps. For example, the interceptor module 102 and/or the client 104 stores a time at which the client 104 was most-recently authenticated and the interceptor module 102 determines whether the client 104 was most-recently authenticated within a defined time interval. Examples of the defined time interval include: 1 second, 5 seconds, 10 seconds, 15 seconds, 30 seconds, 45 seconds, 1 minute, 5 minutes, 10 minutes, 15 minutes, 20 minutes, 30 minutes, 45 minutes, 1 hour, 3 hours, 6 hours, 12 hours, 1 day, 2 days, 3 days, 1 week, and/or 1 month. Additional examples of the defined time interval include: less than about 1 minute, between about 1 minute and about 5 minutes, between about 5 minutes and about 10 minutes, between about 10 minutes and about 15 minutes, between about 15 minutes and about 20 minutes, between about 20 minutes and about 30 minutes, between about 30 minutes and about 45 minutes, between about 45 minutes and about 1 hour, between about 1 hour and about 3 hours, between about 3 hours and about 6 hours, between about 6 hours and about 12 hours, between about 12 hours and about 1 day, between about 1 day and about 2 days, between about 2 days and about 3 days, between about 3 days and about 1 week, and/or between about 1 week and about 1 month.

As discussed above, in step S202c, the interceptor module 102 presents the one or more credentials to authentication module 106.

In step S202d, the authentication module 106 indicates whether the client 104 is authenticated. If the client 104 is authenticated, the interceptor module 102 verifies the client's authorization as discussed below in the context of step S202f. If the client 104 is not authenticated, the request is denied in step S202e.

In step S202f, the interceptor module 102 communicates with an authorization module 108 to determine if the client 104 is authorized to the access the requested resource(s). Alternatively, the interceptor module 102 and/or authorization module 108 performs local validation of a recent authentication token (a secure and random token generated by the authentication module 106 as discussed herein) and/or entitlement token (a one-way hash of a context identifier, a resource identifier, and a secret key as discussed herein) routed from step S202b. For example, if a user closes and then opens a new Internet browser window on a client 104, interceptor module 102 validates the authentication token and/or entitlement token held by client 104 if the authentication token and/or entitlement token was issued and/or validated within a defined time period.

As discussed herein, in step S204, the interceptor module 102 refers the request to one or more resource modules 110. The request is routed to the one or more resource modules 110 by the interceptor module 102 or by a load-balancing device (not depicted) configured to route requests to resource modules 110 capable of handling the request. A resource module's capability to handle a request is a function of the resource module's workload and/or its qualifications. For example, a resource module 110 containing U.S. Supreme Court decisions may not be qualified to handle a request for a Massachusetts Supreme Judicial Court decision, even if the resource module 110 is not currently being utilized.

In step S206, the interceptor module 102 receives one or more responses from the resource modules 110 as further discussed herein the context of the working example.

In step S208, the interceptor module 102 records any events associated with the one or more responses. For example, the events include billing events and/or user experience events. For example, billing events can include information about the resources accessed such as quantity, costs, royalties, and the like. User experience events represent interactions between the client 104 and the system 100 and allow for analysis of aggregate user behavior patterns (e.g., what features are used and how users tend to use them). For example, user experience events include the name of the resource that was accessed, how the user accessed the resource (e.g., what other resources were accessed prior to accessing the resource), executed search commands, and other interactive commands (e.g., commands to email, print, save, or folder a resource). In general, billing events are a subset of user experience events in that a user experience event may or may not be billed to user.

In step S210, the events are removed from the response by the interceptor module 102. Advantageously, this hides the internal structure of system 100. If the response and/or the events have a well-defined format, events are easily identified and removed using regular expressions as discussed herein.

In step S212, the responses are presented to the client 104 by the interceptor module 102. Responses are communicated via a variety of means including wired or wireless transmission.

Once received by the client 104, the responses are presented to the user. For example, data contained in the response is displays on a display device (e.g., a monitor, a television, a liquid crystal display, and the like), saves to memory, printes, and the like.

Method 200 can be repeated a plurality of times. For example, method 200 is executed each time a request from a client 104 is received by interceptor module 102. In embodiments having multiple interceptor modules 102, affinity between a particular client 104 and a particular interceptor module 102 is advantageous (e.g., resulting in a higher cache hit ratio when determining whether the client 104 was recently authenticated), but is not required.

As discussed herein, method 200 can be implemented on general-purpose or specially-programmed hardware or software. For example, method 200 can be implemented by a computer-readable medium (e.g., software stored on interceptor module 102). The computer-readable medium can be non-transitory and/or tangible. For example, the computer readable medium can be volatile memory (e.g., random access memory and the like) or non-volatile memory (e.g., read-only memory, hard disks, floppy discs, magnetic tape, optical discs, paper table, punch cards, and the like).

Working Example

Figure 3:
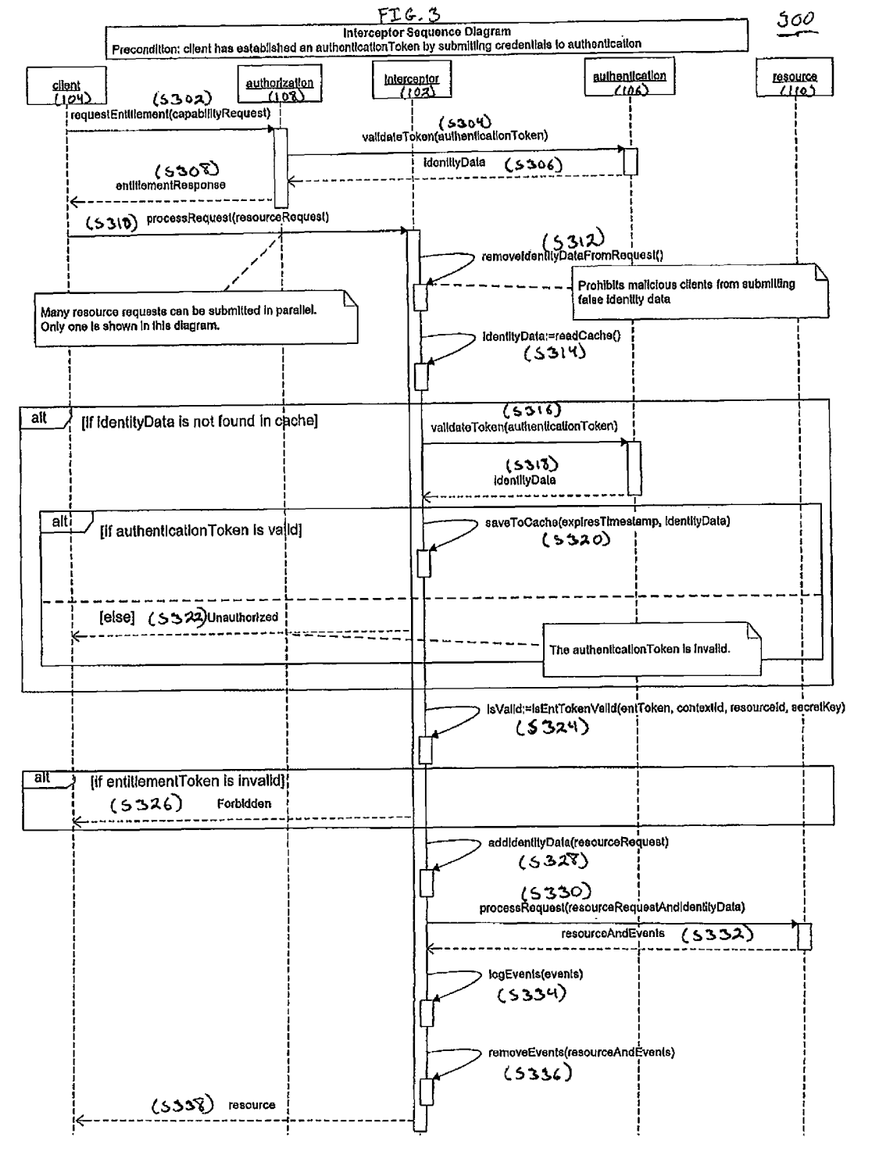
FIG. 3 is a sequence diagram depicting a working example of the invention.

Referring now to FIG. 3, a working example is depicted by sequence diagram 300. In this working example, the client 104 has established an authentication token by submitting credentials to authentication module 106.

The sequence begins in step S302 when the client 104 requests entitlement to access a resource residing on a resource module 110. The request is presented to the authorization module 108 and includes a capability request object, which includes a resource identifier (e.g., a document ID) that uniquely identifies a resource and the authentication token.

In step S304, the authorization module 108 validates the previously-generated authentication token by passing the authentication token to authentication module 106.

In step S306, the authentication module 106 returns identity data to the authorization module 108.

In step S308, the authorization module 108 determines whether the client 104 is entitled to access the resource and responds to the client 104 accordingly. This response includes an entitlement token and a context identifier that serves to further limit the context in which the entitlement token is valid. The entitlement token is a one-way hash of the context identifier, a resource identifier, and the secret key.

The embodiment discussed above, in which the authorization module 108 communicates directly with authentication module 106, is particularly advantageous because authorization module 108 does not rely on interceptor module 102. Such an embodiment allows for immediate revocation of the authentication tokens without the delay of waiting for interceptor module 102 cache entries to expire. However, other embodiments are within the scope of the invention including embodiments in which interceptor module 102 maintains an authentication cache that are utilized to expedite processing of requests from recently-authenticated clients 104.

In step S310, the client 104 next submits one or more resource requests to the interceptor module 102. Each resource request includes a context identifier, a resource identifier (e.g., a document ID), an authentication token (a secure and random token generated by the authentication module 106), and an entitlement token. The one or more requests are presented serially or in parallel.

Identity data is removed from the request in step S312 to prevent malicious clients 104 and/or users from submitting false identity data. The removed identity data is replaced in step S314 with identity data, if any, about the client 104 that was previously cached by interceptor module 102. Thus, even if a malicious client 104 and/or user were to attempt a "spoofing" attack by altering a request to include another user's identity data (e.g., to gain access to another user's litigation documents), this attempt would be spoiled because the altered identity data would be discarded and replaced with the identify data cached the interceptor module 102 and pertaining the authenticated client 104 and/or user.

If identity data is not found in the cache (e.g., because previously-cached identity data expired), the client's token is sent to the authentication module 106 in step S316 for revalidation. New identity data is returned to the interceptor module 102 in step S318. This new identity data is cached for a time period in step S320, for example, the current time plus n seconds. The identity data includes a user identifier and a secret key that is hidden from the client and unique for each authentication token.

The authentication token is validated by the authentication module 106 using many different schemes. In one approach, the authentication token is an encrypted string of the secret key, which corresponds to a specific session. Validation then consists of decrypting the token and validating the secret key against the pool of currently active sessions, which are accessible only from the authentication module 106.

If the authentication token is invalid, the interceptor module 102 sends an appropriate response to the client 104 in step S322.

Once the client 104 is authenticated, the interceptor module 102 determines in step S324 whether the client 104 holds a valid entitlement token. If the entitlement token is invalid, the interceptor module 102 sends an appropriate response to the client 104 in step S326.

If the entitlement token is valid, the interceptor module 102 adds the cached identity data to the resource request in step S328 and submits the cached identity data and the resource request to the resource module 110 for processing in step S330. The resource module 110 returns the requested resource and one or more events to the interceptor module 102 in step S332. As discussed herein, these events are, for example, billing events (e.g., the amount of time required to process the request, the size of the resource, and the cost of the resource). Resources and events are presented in various formats including objects or markup language such as HyperText Markup Language (HTML), Extensible HyperText Markup Language (XHTML), Extensible Markup Language (XML), and the like.

The interceptor module 102 logs these events on the interceptor module 102 or on another system in step S334 and removes the events in step S336 before returning the resource to the client 104 in step S338.

With an illustrated embodiment of the invention being described above, it is to be understood that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, computers, clients, servers and the like) depicted as distinct for purposes of illustration may be incorporated within other functional elements, separated in different hardware, or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

INCORPORATION BY REFERENCE

The entire contents of all patents, published patent applications, and other references cited herein are hereby expressly incorporated herein in their entireties by reference.

The invention claimed is:

1. A computer firewall apparatus for a monetized online content system, wherein said computer firewall apparatus is configured to prevent submission of false identity data by a malicious actor, said computer firewall apparatus configured to prevent submission of false identity data by utilizing a client computer to access database resources residing on a server computer of the monetized online content system, the computer firewall apparatus system comprising:
  one or more computer processors; and
  at least one computer memory storage coupled to said one or more computer processors,
  wherein said one or more computer processors are configured to:
    generate an authentication token for the client computer based on credentials received from the client computer, wherein generating the authentication token includes caching user identity data received from the client computer;
    receive, via a network from the client computer, a request for entitlement to access one or more database resources of the database resources residing on the server computer, wherein the request for entitlement includes the authentication token;
    determine, in response to the request for entitlement to access the one or more database resources, based on the authentication token, that the client computer is entitled to access the one or more database resources;
    generate, in response to the request for entitlement, an entitlement token when it is determined that the client computer is entitled to access the one or more database resources;
    send said entitlement token to the client computer;
    receive a request, via the network from the client computer, for the one or more database resources, wherein the request includes the entitlement token and user identity data;
    remove the user identity data from the received request for the one or more database resources;
    replace the removed user identity with the cached user identity data, thereby preventing access to the one or more database resources by the malicious actor when the received request for the one or more database resources is altered to include false user identity;
    refer the request for the one or more database resources having the user identity data replaced thereon to the server computer;
    receive one or more responses from the server computer, at least one of said one or more responses having one or more events associated therewith;
    record the one or more events in the at least one computer memory storage;
    transform the one or more responses by removing the one or more events associated with the one or more responses, thereby hiding internal processes from a user of the client computer to access the one or more database resources; and
    present the one or more responses having the one or more events removed therefrom to the client computer.

2. The apparatus of claim 1, wherein the one or more events includes one or more billing event that provides information about the resources accessed, said information comprising one of:
  quantity;
  costs;
  royalties; or
  combinations thereof.

3. The apparatus of claim 1, wherein the one or more events includes one or more user experience events that represent one or more interactions between the client computer and the apparatus and allow for analysis of aggregate user behavior patterns.

4. The apparatus of claim 3, wherein the one or more user experience events includes one of:
  a name of a resource that was accessed;
  information regarding how a user accessed the resource;
  executed search commands;
  other interactive commands; or
  one or more combinations thereof.

5. The apparatus of claim 4, wherein the information regarding how the user accessed the resource includes information regarding what other resources were accessed prior to accessing the resource.

6. The apparatus of claim 4, wherein the other interactive commands include commands to one of:
  email the resource;
  print the resource;
  save the resource; or
  combinations thereof.

7. The apparatus of claim 1, wherein the request for the one or more database resources further includes a context identifier, a resource identifier, and the authentication token, the entitlement token comprising one way hash of the context identifier, the resource identifier, and a secret key corresponding to a specific session, the context identifier indicative of context in which the entitlement token is valid.

8. The apparatus of claim 7, wherein the one or more computer processors are further configured to:
  identify one or more credentials in the request;
  determine whether the client computer was most-recently authenticated beyond a defined interval;
  present, in response to a determination that the client computer was most-recently authenticated beyond the defined interval, the credentials to another server computer;
  determine, in response to the other server computer indicating that the client computer is authenticated, whether the entitlement token is valid; and
  delay, in response to the determination that the client computer was most recently authenticated beyond the defined interval, referring the request having the user identity data replaced thereon to the server computer until the entitlement token is determined to be valid.

9. A method of operation for a computer firewall apparatus for a monetized online content system, wherein said computer firewall apparatus is configured to prevent submission of false identity data by a malicious actor, said computer firewall apparatus configured to prevent submission of false identity data by utilizing a client computer to access database resources residing on a server computer of the monetized online content system, the method comprising:
  generating an authentication token for the client computer based on credentials received from the client computer, wherein the generating the authentication token includes caching user identity data received from the client computer;
  receiving, via a network from the client computer, a request for entitlement to access one or more database resources of the database resources residing on the server computer, wherein the request for entitlement includes the authentication token;
  determining, in response to the request for entitlement to access the one or more database resources, based on the authentication token, that the client computer is entitled to access the one or more database resources;

generating, in response to the request for entitlement, an entitlement token when it is determined that the client computer is entitled to access the one or more database resources;

sending said entitlement token to the client computer;

receiving a request, via the network from the client computer, for the one or more database resources, wherein the request includes the entitlement token and user identity data;

removing the user identity data from the received request for the one or more database resources;

replacing the removed user identity with the cached user identity data, thereby preventing access to the one or more database resources by the malicious actor when the received request for the one or more database resources is altered to include false user identity;

referring the request for the one or more database resources having the user identity data replaced thereon to the server computer;

receiving one or more responses from the server computer, at least one of said one or more responses having one or more events associated therewith;

recording the one or more events in computer memory storage;

transforming the one or more responses by removing the one or more events associated with the one or more responses, thereby hiding internal processes from a user of the client computer to access the one or more database resources; and presenting the one or more responses having the one or more events removed therefrom to the client computer.

10. The method of claim 9, wherein the one or more events includes one or more billing events that provides information about the resources accessed, said information comprising one of:
quantity;
costs;
royalties; or
one or more combinations thereof.

11. The method of claim 9, wherein the one or more events includes one or more user experience events that represents one or more interactions between the client computer and the apparatus and that allows for analysis of aggregate user behavior patterns.

12. The method of claim 11, wherein the one or more user experience events includes one of:
a name of a resource that was accessed;
information regarding how a user accessed the resource;
executed search commands;
other interactive commands; or
one or more combinations thereof.

13. The method of claim 12, wherein the information regarding how the user accessed the resource includes information regarding what other resources were accessed prior to accessing the resource.

14. The method of claim 12, wherein the other interactive commands include commands to one of:
email the resource;
print the resource;
save the resource; or
one or more combinations thereof.

15. The method of claim 9, wherein the request further includes a context identifier, a resource identifier, an authentication identifier, and the authentication token, the entitlement token comprising one way hash of the context identifier, the resource identifier, and a secret key corresponding to a specific session, the context identifier indicative of context in which the entitlement token is valid.

16. The method of claim 15, further comprising:
identifying one or more credentials in the request;
determining whether the client computer was most-recently authenticated beyond a defined interval;
presenting, in response to a determination that the client computer was most-recently authenticated beyond the defined interval, the credentials to another server computer;
determining, in response to the other server computer indicating that the client computer is authenticated, whether the entitlement token is valid; and
delaying, in response to the determination that the client computer was most recently authenticated beyond the defined interval, referring the request having the user identity data replaced thereon to the server computer until the entitlement token is determined to be valid.

17. A computer program product for computer firewall apparatus for a monetized online content system, wherein said computer firewall apparatus is configured to prevent submission of false identity data by a malicious actor, said computer firewall apparatus configured to prevent submission of false identity data by utilizing a client computer to access database resources residing on a server computer of the monetized online content system, said computer program comprising:

a non-transitory computer-readable medium have program code recorded thereon that, when enacted by one or more computer processors, causes the one or more computer processors to:

generate an authentication token for the client computer based on credentials received from the client computer, wherein generating the authentication token includes caching user identity data received from the client computer;

receive, via a network from the client computer, a request for entitlement to access one or more database resources of the database resources residing on the server computer, wherein the request for entitlement includes the authentication token;

determine, in response to the request for entitlement to access the one or more database resources, based on the authentication token, that the client computer is entitled to access the one or more database resources;

generate, in response to the request for entitlement, an entitlement token when it is determined that the client computer is entitled to access the one or more database resources;

send said entitlement token to the client computer;

receive a request, via a network from the client computer, for the one or more database resources residing on a server computer, wherein the request includes the entitlement token and user identity data;

remove the user identity data from the received request for the one or more database resources;

replace the removed user identity with the cached user identity data, thereby preventing access to the one or more database resources by the malicious actor when the received request for the one or more database resources is altered to include false user identity;

refer the request for the one or more database resources having the user identity data replaced thereon to the server computer;

receive one or more responses from the server computer, at least one of said one or more responses having one or more events associated therewith;

record the one or more events in computer memory storage;

transform the one or more responses by removing the one or more events associated with the one or more responses, thereby hiding internal processes from a user of the client computer to access the one or more database resources; and present the one or more responses having the one or more events removed therefrom to the client computer.

18. The computer program product of claim 17, wherein the request further includes a context identifier, a resource identifier, an authentication identifier, and the authentication token, the entitlement token comprising one way hash of the context identifier, the resource identifier, and a secret key corresponding to a specific session, the context identifier indicative of context in which the entitlement token is valid.

19. The computer program product of claim 18, wherein the program code further causes the one or more computer processors to:

identify one or more credentials in the request;

determine whether the client computer was most-recently authenticated beyond a defined interval;

present, in response to a determination that the client computer was most-recently authenticated beyond the defined interval, the credentials to another server computer;

determine, in response to the other server computer indicating that the client computer is authenticated, whether the entitlement token is valid; and delay, in response to the determination that the client computer was most recently authenticated beyond the defined interval, referral of the request having the user identity data replaced thereon to the server computer until the entitlement token is determined to be valid.

* * * * *